2 Sheets--Sheet 1.

J. WHEELOCK.
Steam-Engine Valve-Gears.

No. 144,174. Patented Oct. 28, 1873.

Witnesses: Phil. H. Barner, Geo. F. Stenz

Inventor: Jerome Wheelock
By his Attorney

2 Sheets--Sheet 2.
J. WHEELOCK.
Steam-Engine Valve-Gears.
No. 144,174. Patented Oct. 28, 1873.
Fig. 4.
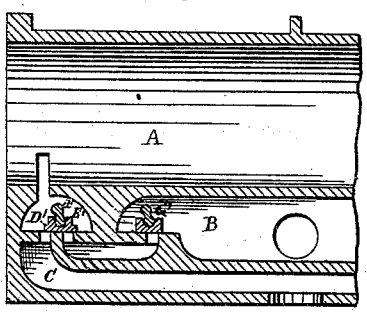
Fig. 5.
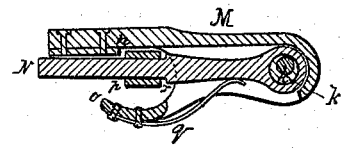
Fig. 8.
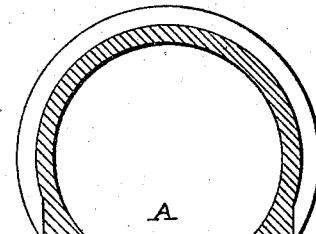
Fig. 6.
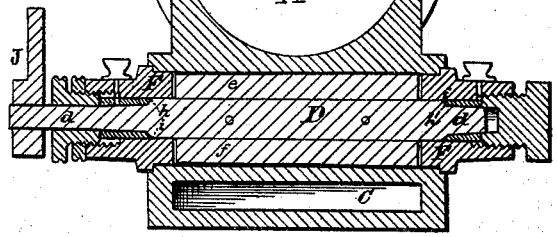
Fig. 7.
Fig. 9.
Fig. 10.
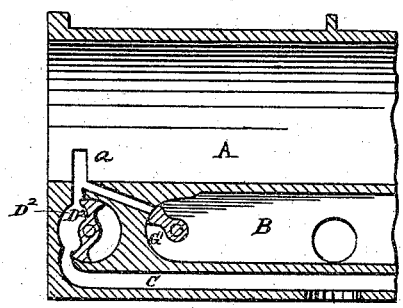
Witnesses.
Phil. F. Barner
Geo. F. Stenz
Inventor.
Jerome Wheelock
By Wm O Wood
Attorney.
AM PHOTO-LITHOGRAPHIC Co.N.Y. (OSBORNE'S PROCESS)

UNITED STATES PATENT OFFICE

JEROME WHEELOCK, OF WORCESTER, MASSACHUSETTS.

IMPROVEMENT IN STEAM-ENGINE VALVE-GEARS.

Specification forming part of Letters Patent No. 144,174, dated October 28, 1873; application filed July 10, 1873.

*To all whom it may concern:*

Be it known that I, JEROME WHEELOCK, of the city and county of Worcester, in the State of Massachusetts, have invented certain new and useful Improvements in Steam-Engine Valve-Gear.

My invention consists partially in certain novel valve-gear for connecting and operating a cut-off valve, either in connection with valves which operate both as induction and eduction valves, or with those which perform the latter function only; also, in combining a double-acting valve and a cut-off valve controlled by the governor with connecting valve-gear in such a manner that both valves will operate to guard against the induction of steam to the cylinder at or before the commencement of the return stroke, whereby the liability of leakage of direct steam into the cylinder after that time is reduced to a minimum. My invention further consists in a novel arrangement of induction and eduction passages with the steam-chest and exhaust-chamber, whereby one port adjacent to the head of the cylinder, and affording desirable "clearance," may serve for the purposes of induction and eduction, and be controlled or guarded by two valves which operate together as one valve during a part or all of the stroke, as may be determined by the governor; and, also, in combining hardened valve-spindles with hardened bushings; and, also, in constructing the said bushings so that they may be longitudinally adjustable within the bonnets for the purpose of compensating for the undue endwise wear of the valve-spindle shoulder which is in contact with the adjacent end of the bushing; and, also, in so constructing the shoulder on the valve-stem and the coincident surfaces of the bushing that the two as they wear will always maintain a practically steam-tight joint; and I do hereby declare that the following specification, taken in connection with the drawings furnished and forming a part of the same, contains an accurate and true description of the several features of my invention.

Figure 1:
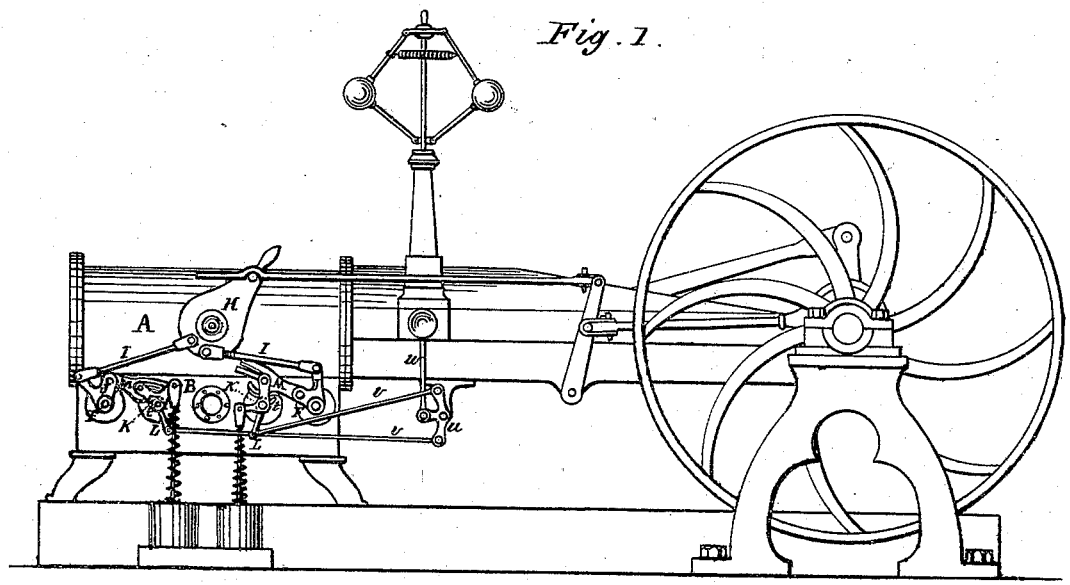
Figure 2:
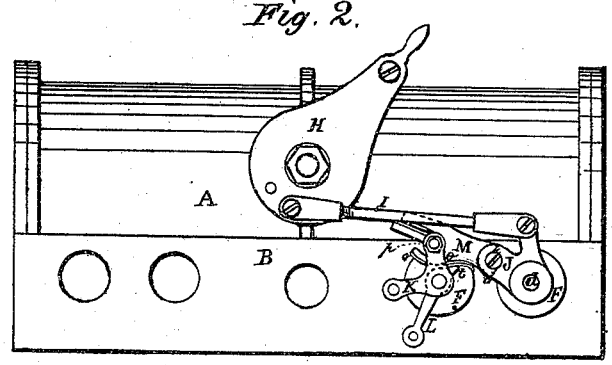
Figure 3:
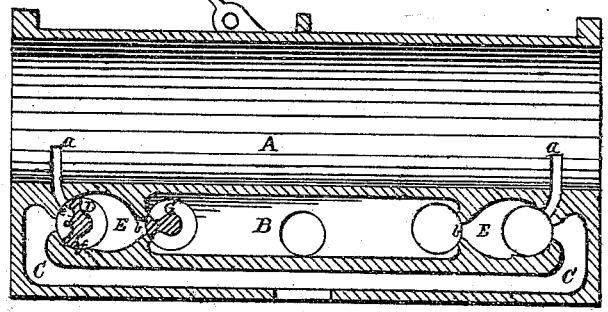

Referring to the drawings, Figure 1 represents, in side elevation, an engine which embodies my present improvements. Fig. 2 represents, in an enlarged view, the wrist-plate and the valve-operating mechanism. Fig. 3 represents the interior of the cylinder and valve-chamber in longitudinal vertical section. Fig. 4 represents, in section, a portion of a cylinder with the valve-operating mechanism applied to valves of a different construction. Fig. 5 represents, in longitudinal section, the latch-link which connects the valves and is controlled by the governor. Fig. 6 represents, in perspective, one of the double-acting valves which controls the induction and eduction of steam to and from the cylinder. Fig. 7 represents, in perspective, one of the single-acting cut-off valves which controls the passage of direct steam to the double-acting valve. Fig. 8 represents, in lateral vertical section, the cylinder and valve-chamber on a line with the axis of one of the double-acting valves. Fig. 9 represents the pin-bolt which connects the latch-link with the crank-lever of the double-acting valve. Fig. 10 represents a simple exhaust-valve combined with a cut-off valve, arranged to guard different passages from and to a port of a cylinder which is common to both.

A denotes the cylinder of a horizontal engine, in connection with which I have embodied my present improvements for the purposes of illustration. The adaptation thereof to vertical engines will obviously involve but slight variation of the mechanical details. At each end of the cylinder, preferably on the lower side, are the steam-ports $a$, through which induction and eduction of steam are effected. B denotes the steam-chest, which is preferably located beneath the cylinder, with its connection with the steam-pipe located at a point midway between the two ends. C denotes the exhaust-chamber, which is also located below the cylinder and beneath the steam-chest. Its connection with the exhaust-pipe is in the same vertical plane with the steam-pipe entrance to the steam-chest. By the arrangement of the ports, steam-chest, and exhaust-chamber, as shown, the steam has an easy and direct entrance to and exit from the cylinder, and in case of "priming" the water finds a free exit to the exhaust-chamber. D denotes one of the double-acting valves, which guards one of the ports $a$, and controls the induction and eduction of steam to and from the cylinder. It is in this instance a two-winged valve, mounted on a reciprocatory rotative valve-spindle, $d$, of peculiar construction, hereafter more fully described. The faces of the wings of the valve D, which are in contact with the valve-seat, are turned off and finished in a lathe, with its spindle on centers in such a manner that the said faces will be slightly inclined longitudinally, as if they were a portion of a cone. The valve-chamber E is reamed out from the side with a correspondingly interior surface, which constitutes the seat with which the two wings of the valve engage. The upper wing, $e$, of the valve is the operative one, which alternately opens communication between the port $a$, the valve-chamber, and the exhaust-chamber. The lower wing, $f$, performs a steadying function by being in contact with a surface nearly opposite the valve-seat, and it also cuts off communication between the valve-chamber and the exhaust-passage. The face of the wing $f$ has about the same area as that of the wing $e$, and it should be no greater, as it is desirable to reduce frictional surfaces to a minimum. It will be seen that the two wings in section occupy less than one-half of the circle, and that the pressure of the direct steam in the valve-chamber will be the same on both wings above and below the axis of the spindle, in a measure relieving the operative wing from undue pressure, and at the same time holding the faces of both wings to their seats should there chance to be any play of the journals of the valve-spindles in their bearings. The movement of a valve so constructed is accomplished with the expenditure of but little power. The journals of the valve-spindles are composed of hardened steel, and are the two ends of a valve-shaft, which may extend longitudinally through the valve, or they may be made separately and tapped into the valve at each end; and their bearings are bushings $h$ and $h'$, also of hardened steel. Adjacent to the ends of the valve the spindles have an inclined or conical faced shoulder, as at $i$, and the ends of the bushings are correspondingly shaped to receive them. The bushing $h$ receives the end of the spindle to which the valve-stem is connected, and the bushing $h'$ carries the opposite end. Each of the bushings is provided with an exterior screw-thread, which is fitted to its respective bonnet F in such a manner that the bushing may be longitudinally adjusted therein toward and away from the valve. The bushing $h'$ is open only at its interior end to receive one journal of the spindle, and, as before stated, the spindle-bearing at the opposite end passes entirely through the bushing $h$. The pressure of the steam in the valve-chamber, therefore, has a constant tendency to force the valve and spindle toward the bushing $h$, and as the taper of the valve faces before described also lessens in that direction there is a tendency always to self-compensate for any wear that may occur by the continued longitudinal advancement of the valve in that direction.

It will be seen that the bushings have also a plain exterior surface for a part of their length, of a less diameter than the threaded surface, and that the bonnets F are correspondingly chambered; and, also, that the diameter of the enlargement on the spindle adjacent to the valve-head is the same as that of the plain portion of the inner end of the bushing, and that, as a consequence, the entire annular inclined surface will be uniformly worn away; and that the bushing, if advanced to the valve, will compensate therefor.

Set-screws or check-nuts may be employed in a manner well known, for preventing undue rotary movement of the bushings. The valve-spindle bearings may be lubricated by oil-holes through the bonnets at the inner end of the threaded recess, and in the bushings at a proper point adjacent thereto. An effective and desirable lubrication may also be practically effected by having an axial opening drilled in the center of the bushings $h'$, with a small elbow-pipe secured therein, and a cup with a suitable cock.

To lubricate the bearings in the bushings $h$, an axial opening may be drilled in the end of the spindle prior to its being hardened, which, at its inner end, would communicate with one or more radial openings, so that the application of oil could readily be made by employing an elbow and cup permanently attached and moving with the spindle in its rocking movement.

By having the valve-spindles and bushings of hardened metal, a high degree of finish is attainable, and the friction incident to their operation is reduced to a minimum.

G denotes one of the two cut-off valves which guard the ports $b$, through which the valve-chambers E connect with the steam-chest. Like the valves D, the cut-off valves are mounted on spindles of the same character, which are, in turn, provided with steel journals and bushings, as described, in connection with the double-acting valves. The seats of the cut-off valves are turned out through the bonnet-holes, as in the case of the other valves, and the longitudinal face of each valve is inclined in the same manner. So, also, is one end of the spindle housed in the bushing within the bonnet, and the opposite end extended through the bushing and bonnet, and therefore, as with the other valves, the pressure of the steam thereon has a tendency to induce an endwise adjustment as fast as any wear occurs. The heads of all the valves are circular, and are fitted to recessed chambers in the bonnets. The inclined bearing-face $i$, at the inner end of the valve-journal, by its wedge-like action in its recess in the bushing, maintains a practically steam-tight joint without special packing. The wrist-plate H is connected with the eccentric in the usual manner by a detachable rod. The valve-rods I connect the wrist-plate with the valves D by means of crank-levers J, which are pinned or keyed to the outer ends of the valve-spindles. The bonnets of the cut-off valves are not so long as the others, for the reason that their spindles, although having the same length, have not only to carry the bell-crank lever K but a trip-cam lever L, which is connected by rods and a lever with the governor. The bell-crank lever K is connected by one arm to the dash-pot weight in the usual manner. M denotes a latch-link of peculiar construction. It is connected at one end with a short arm, $j$, on the crank-lever J, by an eccentric-shaped bolt, $k$, shown in Fig. 9. As represented in Fig. 5, the link is provided with a latch-shoulder, as at $n$, and with a jaw, $o$, adjacent thereto, but below it. N denotes the latch-rod. It is partially inclosed within the latch-link M, and is pivoted therewith at one end to the crank-lever J by the same bolt $k$, which is so arranged in its bearings in the crank-lever that, by turning it therein, and setting it in position, the latch-link and rod may be simultaneously advanced or withdrawn somewhat, and thus admit of the longitudinal adjustment thereof. The latch-rod N is provided with a square shoulder at $r$, adjacent to the rear surface of the jaw of the link, and from that point to its outer end it is rounded like a spindle, and extends slightly beyond the jaws of the link. On the vertical arm $m$ of the crank-lever K is a latch-block, $p$, swiveled on an axis which is mounted on the lever-arm after the manner of a crank-pin. Through the latch-block is a cylindrical opening, to which the spindle of the latch-bolt is fitted, so that it may freely slide to and fro therein. A flat curved spring, $q$, is riveted to the under surface of the jaw $o$, and it is so arranged that, by bearing on the latch-rod at a point about midway between the outer end of the latch-link and the bolt $k$, the link is kept down as far as the upper surface of the latch-block $p$ will permit. The space between the shoulder at $r$ on the latch-rod, and the latch-shoulder $n$ on the upper jaw of the latch-link, (when the two parts are in proper relation to each other,) is but a trifle greater than the length of the latch-block $p$, so that, when the latter is between the two, it can have no independent movement. The spring $q$ serves to maintain proper connection of the latch-shoulder $n$ with the latch-block until its power is overcome by the action of the governor. The tripping-lever L, which, as before described, is mounted loosely on the cut-off-valve spindle in the rear of the bell-crank lever K, is provided with a toe-cam, $t$, which engages with the lower surface of the jaw $o$, and, if properly actuated by rods and levers connected with the governor, it will lift the latch-link so as to disengage the shoulder $n$ from the latch-block $p$ and allow the cut-off valve to be promptly closed by the fall of the dash-pot weight, which is connected, as usual, to one of the arms of the bell-crank lever K.

In Fig. 4 I have shown slide-valves arranged to be controlled in the same manner as the valves already described. The valve $D^1$ is a double-acting valve which controls the induction and eduction of steam, as is the case with either of the valves D. The valve-operating spindle $d'$ operates as a wiper for giving the valve its reciprocatory movement. The valve-chamber $E'$ corresponds with the chamber E already described, and the single-acting cut-off valve $G'$ guards the connecting-port, which enters the steam-chest in the same manner as described with the rocking valves G.

In Fig. 10 I have represented a valve, $D^2$, which in no manner operates as an induction-valve, and the cut-off valve $G'$, which in no manner differs from the valves G already described. It will be seen that the clearance is the same as in the illustration, Fig. 3, for in both the induction and the eduction passages communicate with the one port $a$. In engines with valves so constructed it will be essential that the cut-off valve be so accurate in its fitting that no objectionable leakage can occur. Such valves are more liable to injurious wear than those which are more loosely fitted, and the power requisite for operating the latter is of course much less than the former. For these reasons it is of great practical value that two valves be arranged to guard the same induction-port, even if both should leak a little.

In the arrangement of valves shown in Fig. 4, the cut-off valve when opened only for a portion of the stroke, immediately on closing in a measure relieves the double-acting slide-valve from direct pressure on the steam side, and therefore the valve is more evenly seated during its exhaust movement. So, also, with the valves D, as illustrated in Fig. 2, for as soon as the cut-off valve closes the pressure of the direct steam on the back of the valve during the closing and exhaust movement is prevented, and it is only backed up by steam at a pressure about equal to that within the cylinder at the end of the stroke. In the exhaust-valve $D^2$ of Fig. 10 the lower wing, which serves simply as a steadying-arm, may be skeletonized, and, with the exception of a few guiding segments, with which it should be in contact, the whole surface may be of an open character, whereby the exhaust may be more freely effected.

It will be seen that when the governor-balls fly high, both of the latch-links will be raised, and consequently that neither of the cut-off valves will be opened, and, on the contrary, that when the balls fly low, both cut-off valves will be opened and closed simultaneously with their respective double-acting valves, each two valves acting as if they were but one valve. With the usual adjustments for a stated speed the cut-off will be effected readily and easily at any portion of the stroke at which it may be necessary to cut off the direct steam.

Recognizing the desirability of having no sliding or loose connections between the wrist-plate and the valves, I have arranged the cut-off and the double or single acting valves closely adjacent to each other and in the same plane, and have so connected the two that, although the latch-link when engaged with the cut-off valve is rigidly connected therewith, and although the said link is also rigidly connected with the other valve, the latter, during the entire eduction or exhaust movement communicates no appreciable motion to the cut-off valve; and, in lieu thereof, only a slight movement in a nearly-vertical plane is given to the pivoted end of the latch-link. By this means the wear of the operative mechanism is reduced to a minimum, and great simplicity, effectiveness, and economy in construction are attained.

The intermittent periods of rest of the cut-off valve-crank are readily attained, while the other valve is operating on the exhaust, by having the short arm $j$ of the crank-lever J of such a comparative length, and so set with relation to the long arm that, during the exhaust movement, the connection of the latch-link with the cut-off valve, and the connection of the link with the arm $j$, will, when the cut-off valve has been closed by it, occupy, or nearly occupy, a line extending from the axis of the double-acting valve-spindle to the connection of the latch-link with the cut-off valve-crank, as seen in the drawings.

After having fully closed, by a continued movement in the same direction, the valve D commences to uncover the port for the exhaust, and, at about that moment, the short arm $j$ ceases to move the latch-link longitudinally, and merely rocks or vibrates it on the latch-block during the time the port is being uncovered for eduction.

The governor is connected with the trip-cam lever L by means of the vertical rod $w$, the triple-armed crank-lever $u$, and the rods $v$; and it will be readily seen that the toe of the trip-cam will lift the jaws of the latch-link free from the latch-block, and release the cut-off valve whenever the governor shall so determine.

Having thus described my invention, I claim as new and desire to secure by Letters Patent—

1. A cut-off valve and a valve which controls the eduction of steam from the cylinder, each of which is operated by a valve-spindle, which partially rotates reciprocally on its axis, in combination with a latch-link for connecting the two valves, and a cam-lever which, by the movement of the governor, is made to control the connection of the latch-link with the cut-off valve, substantially as described.

2. A double-acting valve for controlling the induction and eduction of steam to and from the cylinder, and a cut-off valve, each arranged to be operated by a reciprocally-rotating valve-spindle, in combination with a latch-link which connects the two valves, and a cam-lever controlled by the governor, and arranged to effect a disconnection of the latch-link with said cut-off valve, substantially as described.

3. The combination of a semi-rotating valve with a hardened journal fitted thereto, and hardened bushings fitted to the bonnets F, and to receive the journals, substantially as described.

4. The combination, with the bonnets F and the valve-spindles, of the longitudinally-adjustable bushings, substantially as described.

5. The combination of the valve-spindle with the inclined-faced shoulder adjacent to its inner end near the head of the valve, and the bushing, which is provided with a recess at the end for receiving the shoulder, substantially as described.

6. The combination of the eccentric bolt $k$ with the latch-link and its actuating crank-lever, substantially as and for the purposes described.

JEROME WHEELOCK.

Witnesses:
E. C. HEYWOOD,
GEO. H. SOUTHWICK.